United States Patent [19]

Adams et al.

[11] 3,998,935
[45] Dec. 21, 1976

[54] MANUFACTURE OF POTASSIUM SULFATE

[75] Inventors: Ben E. Adams, Hanford, Calif.; John B. Sardisco, Shreveport, La.; Erhart K. Drechsel, Houston, Tex.

[73] Assignee: Pennzoil Company, Shreveport, La.

[22] Filed: Jan. 30, 1975

[21] Appl. No.: 545,554

[52] U.S. Cl. .............................. 423/552; 23/302 R; 423/482
[51] Int. Cl.$^2$ ...................... C01D 5/02; C01B 7/08
[58] Field of Search .......... 423/552, 481, 482, 199, 423/202; 23/296, 302

[56] References Cited
UNITED STATES PATENTS

| | | | |
|---|---|---|---|
| 995,105 | 6/1911 | Thompson | 423/552 X |
| 2,816,820 | 12/1957 | Pernert | 423/482 X |
| 2,902,341 | 9/1959 | Baniel et al. | 423/552 X |
| 3,687,639 | 8/1972 | Barlow et al. | 423/552 X |

FOREIGN PATENTS OR APPLICATIONS

| | | | |
|---|---|---|---|
| 1,100,258 | 9/1955 | France | 423/552 |
| 1,145,390 | 3/1969 | United Kingdom | 423/482 |

OTHER PUBLICATIONS

Seidell, A., Solubilities of Inorganic and Metal Organic Compounds, American Chemical Society, Washington, DC, 1965, 4th Edition, vol. II, pp. 116, 133–135, 297–299, 301, 982–984.
Handbook of Chemistry & Physics, Hodigins Editor, 43 edition, 1961, Chemical Rubber Publishing Company, Cleveland, Ohio, pp. 626–627, 636–637.

*Primary Examiner*—Oscar R. Vertiz
*Assistant Examiner*—Gary P. Straub
*Attorney, Agent, or Firm*—Lowe, King, Price & Markva

[57] ABSTRACT

Potassium sulfate ($K_2SO_4$) is prepared by contacting potassium chloride with an aqueous solution containing potassium bisulfate at a temperature of about 65°–110° C., cooling the solution and permitting the potassium sulfate to crystallize from solution.

12 Claims, 3 Drawing Figures

MANUFACTURE OF POTASSIUM SULFATE

BACKGROUND OF THE INVENTION

1. Field of the Invention

This invention relates to the manufacture of potassium sulfate and more particularly to a method for the preparation of potassium sulfate by the reaction of potassium chloride and potassium bisulfate contained in an aqueous solution under moderate reaction conditions.

2. Description of the Prior Art

Potassium sulfate is a well known inorganic compound which has found great utility in many areas, for example, as a fertilizer and as an intermediate for the production of useful products. Consequently, the prior art has been aware of various methods for preparation of potassium sulfate for many years. In one common procedure, potassium sulfate has been prepared by the reaction of potash (KCl) and sulfuric acid. Usually, however, it is necessary to carry out such reactions under rather severe reaction conditions in order to eliminate the hydrogen chloride evolved during the reaction and shift the reaction toward production of the potassium sulfate. An inherent problem in carrying out this process is that it is a two step reaction involving an intermediate reaction in which the potash and sulfuric acid react to form potassium bisulfate ($KHSO_4$) with the elimination of one mole of hydrogen chloride. It has been difficult heretofore to carry the reaction to completion and eliminate two moles of hydrogen chloride in conducting this reaction in view of the thermodynamics involved in the reactions being carried out. For these reasons, it has been necessary for the art to utilize rather extreme reaction conditions, e.g. temperatures of above 100° C. and higher in order to obtain an economically attractive yield of potassium sulfate of reasonable purity from the reaction. These extreme reaction conditions however merely cause additional problems as the strong sulfuric acid and chlorine present at high temperatures cause severe corrosion problems. Therefore, a clear need remains in the art for methods by which potassium sulfate can be produced under moderate reaction conditions utilizing readily available starting materials.

In most of the prior art procedures, the key to a successful process resides in complete elimination of the HCl gas. A large body of art is available which discloses such reactions involving the production of $K_2SO_4$ or $Na_2SO_4$. A typical art reference of this type is U.S. Pat. No. 2,762,689 which involved the reaction of NaCl and $H_2SO_4$ at temperatures of 200° to 250° C. Also in U.S. Pat. No. 2,275,825 $Na_2SO_4$ and hydrochloric acid are prepared by the reaction of a slurry comprising water, NaCl, $NaHSO_4$ and $H_2SO_4$ with steam in a countercurrent reaction zone at temperatures of 120° to 160° C. With respect to prior art of this type, it should be noted that the aqueous sulfuric acid systems of $Na_2SO_4$ and $K_2SO_4$ are not generally considered to be equivalent in the recovery of desired products as they behave differently. Thus, $K_2SO_4$ forms mixed acid salts on solution/crystallization whereas $Na_2SO_4$ forms hydrates of either $Na_2SO_4$ or $NaHSO_4$; "Solubilities of Inorganic and Metal Organic Compounds", Seidell 4th Ed., Vol. 2, pps. 1126–27.

A patent of somewhat more pertinence to the present invention is U.S. Pat. No. 3,687,639 which discloses a process of precipitating $K_2SO_4$ crystals from an aqueous solution of $K_2SO_4$ by dissolving sufficient KCl in the solution to affect the solubility of the $K_2SO_4$ and cause it to crystallize. However, this is strictly a physical procedure as the $K_2SO_4$ is already formed. A similar reference with respect to sodium sulfate recovery is U.S. Pat. No. 2,125,624. However, these patents are not concerned with the particular reaction of the present invention.

To Applicants' knowledge, none of these prior methods have been entirely successful and there remains a clear need in the art for methods by which potassium sulfate can be prepared under moderate reaction conditions and in high purity and yield. The present invention is believed to provide a solution to this problem.

SUMMARY OF THE INVENTION

It is accordingly one object of this invention to provide a method for the preparation of potassium sulfate.

A further object of the invention is to provide a method for the preparation of potassium sulfate under moderate reaction conditions and in high purity.

A still further object of the invention is to provide a method for the production of potassium sulfate by contacting potassium chloride with potassium bisulfate in an aqueous solution.

A further object of the invention is to provide a method for the production of potassium sulfate under moderate reaction conditions.

An even further object of the invention is to provide a continuous method for the production of potassium sulfate.

Other objects and advantages of the present invention will become apparent as the description thereof proceeds.

In satisfaction of the foregoing objects and advantages, there is provided by this invention a method for the production of potassium sulfate which comprises reacting potassium chloride with potassium bisulfate in an aqueous solution at a temperature of about 65°–110° C., permitting the solid potassium sulfate to crystallize from the solution by cooling to a temperature to about 40°–60° C. and recovering the solid potassium sulfate formed. The present invention also provides a method by which this reaction can be carried out in the substantial absence of hydrogen chloride evolution and wherein after removal of the solid potassium sulfate, there is provided a filtrate solution which after excess water removal, is suitable for recycle to a plant which provides for preparation of the potassium bisulfate starting material. Further, the invention provides a combination procedure for the preparation of the potassium bisulfate starting material and its use in the preparation of potassium sulfate.

BRIEF DESCRIPTION OF THE DRAWINGS

Reference is now made to the drawings accompanying this application wherein there is shown in FIG. 1 a schematic diagram showing the process steps of a continuous method of the present invention.

DESCRIPTION OF PREFERRED EMBODIMENTS

Figure 1:
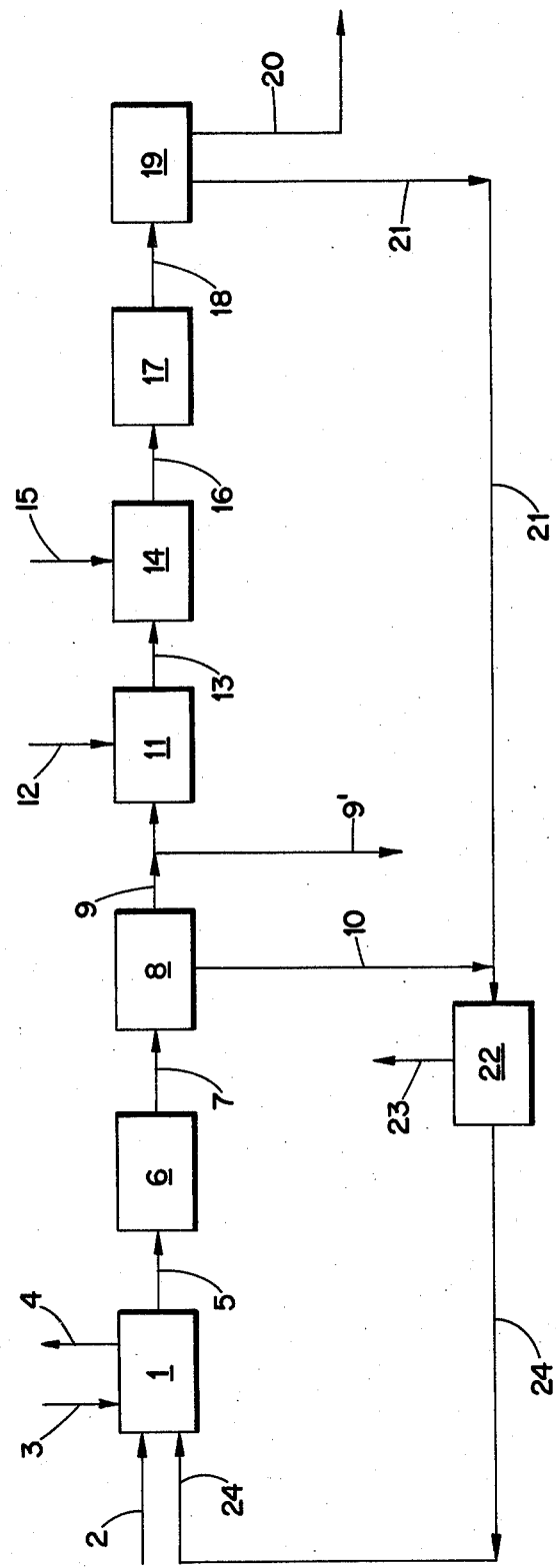

As indicated above, the present invention is concerned with a unique method for the preparation of potassium sulfate ($K_2SO_4$), by the reaction of potassium chloride and potassium bisulfate (KHSO$_4$) in aqueous solution. It has been found that the simple procedures provided by this invention will operate to provide a relatively pure solid potassium sulfate together with a filtrate which is suitable for recycle to a plant which provides the starting potassium bisulfate It has been found according to this invention that solid potassium sulfate can be prepared from potassium chloride/potassium bisulfate/water solutions by a unique series of steps. In general, this process comprises initial formation of a solution of potassium bisulfate in water at any desired temperature and thereafter adding the potassium chloride thereto either as a solid or as an aqueous solution. For convenience of operation, it is preferred to add the KCl as a solid. This initial step is carried out at temperatures sufficiently high to form a solution of the potassium chloride with the potassium bisulfate and water. Once the solution is complete it is thereafter cooled, as for example in a crystallizer, and the solid potassium sulfate will crystallize from solution and can be easily recovered. A feature of the invention is that the filtrate recovered after removal of the solid potassium sulfate is then suitable for use in an initial reaction for preparation of the potassium bisulfate starting material after removal of excess water.

In the first step of the process of this invention, a solution of potassium bisulfate in water is prepared, the solution containing a sufficient excess of water to provide easy solubilization. Preferably, the KHSO$_4$ is dissolved in about 1 to 4 times its amount of water by weight. After this solution is prepared, the KCl is then added thereto. While the KCl may be added in aqueous solution, in preferred embodiments solid KCl is added slowly or in increments to the KHSO$_4$ solution while the latter is maintained at a temperature of about 65°–110° C. In a continuous operation of course all reactant additions are made continuously. Usually the heat of reaction will maintain the desired temperature. Alternatively, the KCl may be added and the mixture thereafter heated to 65°–110° C. to effect solubilization. In any event complete solubilization is obtained. While the potassium chloride and potassium bisulfate may be used in substantially equivalent molar amounts for reaction, it is highly preferred that there be used a slight molar excess, for example up to 15% and preferably up to 10%, of the potassium chloride in order to enhance the yields and production of the potassium sulfate product.

After complete solution of the potassium chloride has been obtained, the solution is then cooled for crystallization of the K$_2$SO$_4$. In a preferred aspect, the warm solution is fed to a vacuum crystallizer wherein temperatures of 40°–60° C. are maintained. The solid potassium sulfate will crystallize from solution and may be recovered by use of a separator of the conventional type such as a filter or centrifuge. The recovered solid cake may be washed one or more times as desired in order to enhance purity.

During the solubilization and crystallizing steps, the evolution of HCl gas is almost undetectable and therefore considered minimal. In fact, a maximum of about 3% of the HCl present may be evolved.

The filtrate recovered from the separation step comprises a solution containing potassium, chloride, bisulfate, sulfate, and hydrogen ions and water and is suitable for recycle to a reactor for use in the initial preparation of the potassium bisulfate after excess water removal. Thus, the potassium sulfate process when combined with a potassium bisulfate plant as disclosed herein, lends itself economically and conveniently to a continuous method.

The method for preparation of the potassium bisulfate utilizes the reaction of sulfuric acid and potassium chloride on substantially a molar basis with the evolution of hydrogen chloride. In this reaction potassium chloride and sulfuric acid are added to a reactor and maintained at a temperature of about 80° to 120° C. or up to the boiling point of the solution. As the reaction proceeds, hydrogen chloride gas is evolved and may be removed and recovered by conventional water scrubbing procedures well known to the art or further dried and recovered as anhydrous HCl. The resulting solution may then be cooled as in a crystallizer at 35° to 50° C. to precipitate the KHSO$_4$ product. The slurry is then removed to a separator such as a filter for removal of the solid potassium bisulfate. The filtrate, including any wash water, is recovered from the separator and is suitable for recycle to the reaction with the sulfuric acid preferably after excess water removal. The solid potassium bisulfate is then dissolved in the appropriate amount of water to form a solution of about 10–50%, for example, to be in a form suitable for reaction with the potassium chloride in the preparation of the potassium sulfate in accordance with this invention.

The overall reaction scheme of the continuous process is illustrated in FIG. 1 of the accompanying drawing wherein it will be seen that in reactor 1, sulfuric acid from line 2 and potassium chloride from line 3 are reacted at a temperature of up to 120° C. with the evolution of hydrogen chloride through line 4. After the reaction is complete the resulting mixture is removed by line 5 to crystallizer 6 which is maintained at a temperature of about 45° C. to precipitate the KHSO$_4$. The resulting slurry is removed by line 7 to filter or other separator 8. From filter 8, the solid KHSO$_4$ is recovered by line 9. At this point the KHSO$_4$ is in condition to be used in formation of the K$_2$SO$_4$. While any amount of the KSHO$_4$ can be utilized in the K$_2$SO$_4$ reaction, in the continuous system of this preferred embodiment, it is preferred to separate the KHSO$_4$ into two portions as the recycle requirements are such that only a portion of the KHSO$_4$ is reacted to form K$_2$SO$_4$ in the continuous operation. However, the invention is inclusive of a system where all the KHSO$_4$ is utilized to react with KCl in formation of the K$_2$SO$_4$. Accordingly, in the preferred continuous operation of FIG. 1, about 30–50 weight percent, preferably 35–40 weight percent, of the KHSO$_4$ is removed by line 9' for storage or other use while the remaining 50–70, preferably 60–65, weight percent in line 9 is converted in the potassium sulfate plant. The filtrate from filter 8 is removed by line 10 for evaporation of water therefrom and subsequent recycle to reactor 1. In the preferred embodiment, the filtrate in line 10 is combined with the filtrate in line 21 coming from the K$_2$SO$_4$ filter, with subsequent evaporation and recycle as explained hereinafter.

The indicated portion of solid potassium bisulfate from line 9 is then dissolved in water. The water used can be water recovered from evaporation 22 and recovered from line 23, which technique contributes to a continuous procedure. The KHSO$_4$ from line 9 is dissolved in the water from line 12 in solution tank 11 and then removed by line 13 to reactor 14 where, at a temperature of 65°–110° C., potassium chloride, preferably in solid form, but if desired after dissolution in water, is introduced by line 15. The resulting solution is then removed by line 16 to crystallizer 17 where it is cooled to a temperature of 45° C. for the precipitation of potassium sulfate. The resulting slurry is removed by line 18 to filter 19 and solid potassium sulfate is recovered by line 20. The filtrate from filter 19 is removed by line 21 to evaporator 22, after combining with the $KHSO_4$ filtrate from filter 8, where excess water is removed by line 23. While the water removed by line 23 can be used as desired, it is preferable to recycle at least a portion to solution tank 11 by line 12. The resulting mixture is then recycled via line 24 to reactor 1. Thus, it will be seen that a complete continuous process is provided in which moderate reaction conditions are utilized in both systems with the recovery of potassium sulfate as a final product.

In an alternative embodiment, the continuous process of the invention can be carried out by producing the desired 1:1 molar solution of $KHSO_4$ and KCl necessary for the formation of $K_2SO_4$ directly in the first reactor section by maintaining the $KHSO_4$/KCl solution at its boiling point, e.g. about 115°–120° C., to eliminate excess HCl and then adding fresh feed comprising 2 moles of KCl and 1 mole of $H_2SO_4$, and cooling the reaction solution to crystallize the $K_2SO_4$ and/or a mixture of $KHSO_4$/$K_2SO_4$. This embodiment eliminates the need to split the $KHSO_4$ product into two portions prior to introduction into the $K_2SO_4$ plant and will utilize all the $KHSO_4$ produced.

Figure 2:
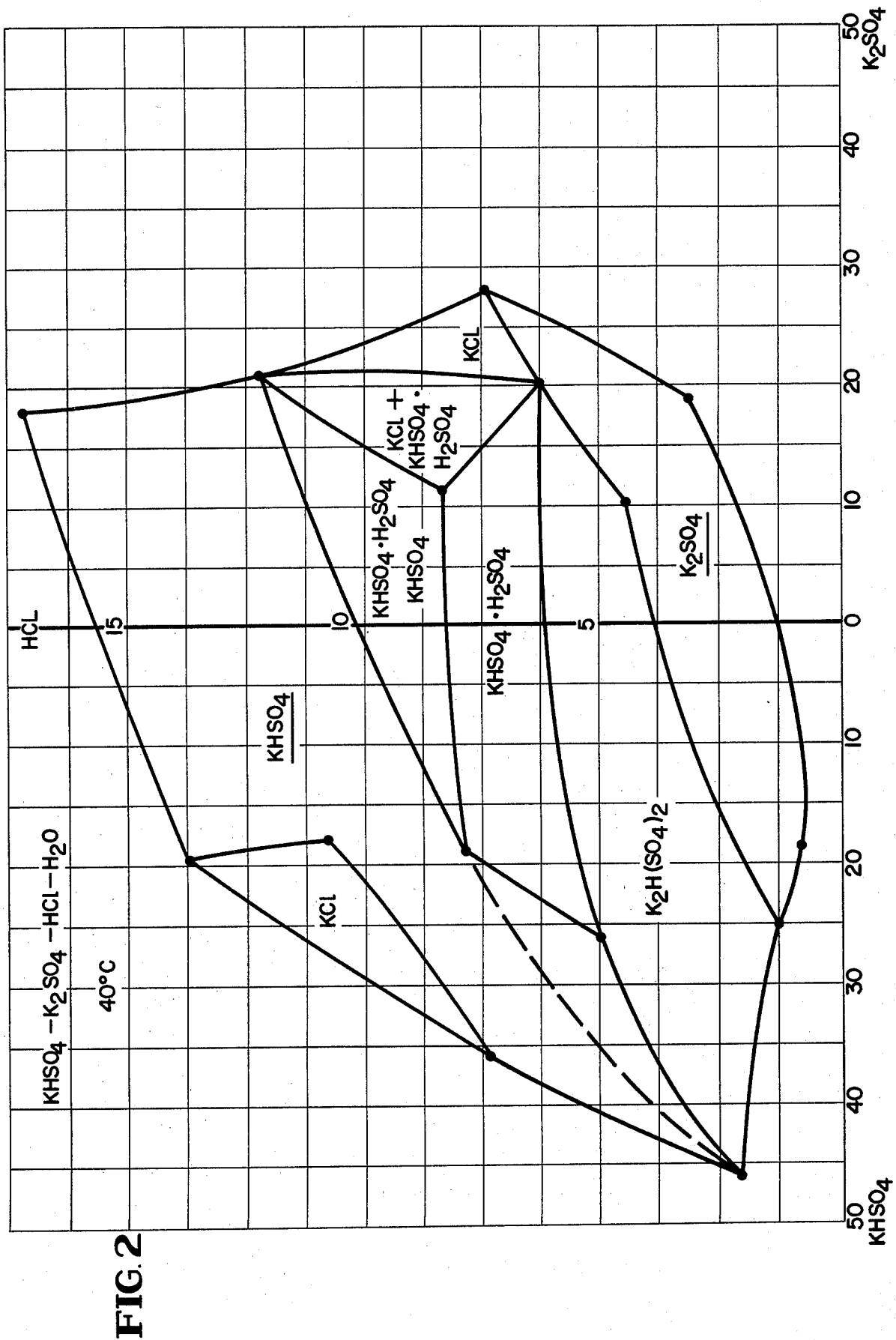
FIGS. 2 and 3 show phase diagrams which illustrate the concepts under which the reaction of the present invention is carried out when conducted at different temperatures.
Figure 3:
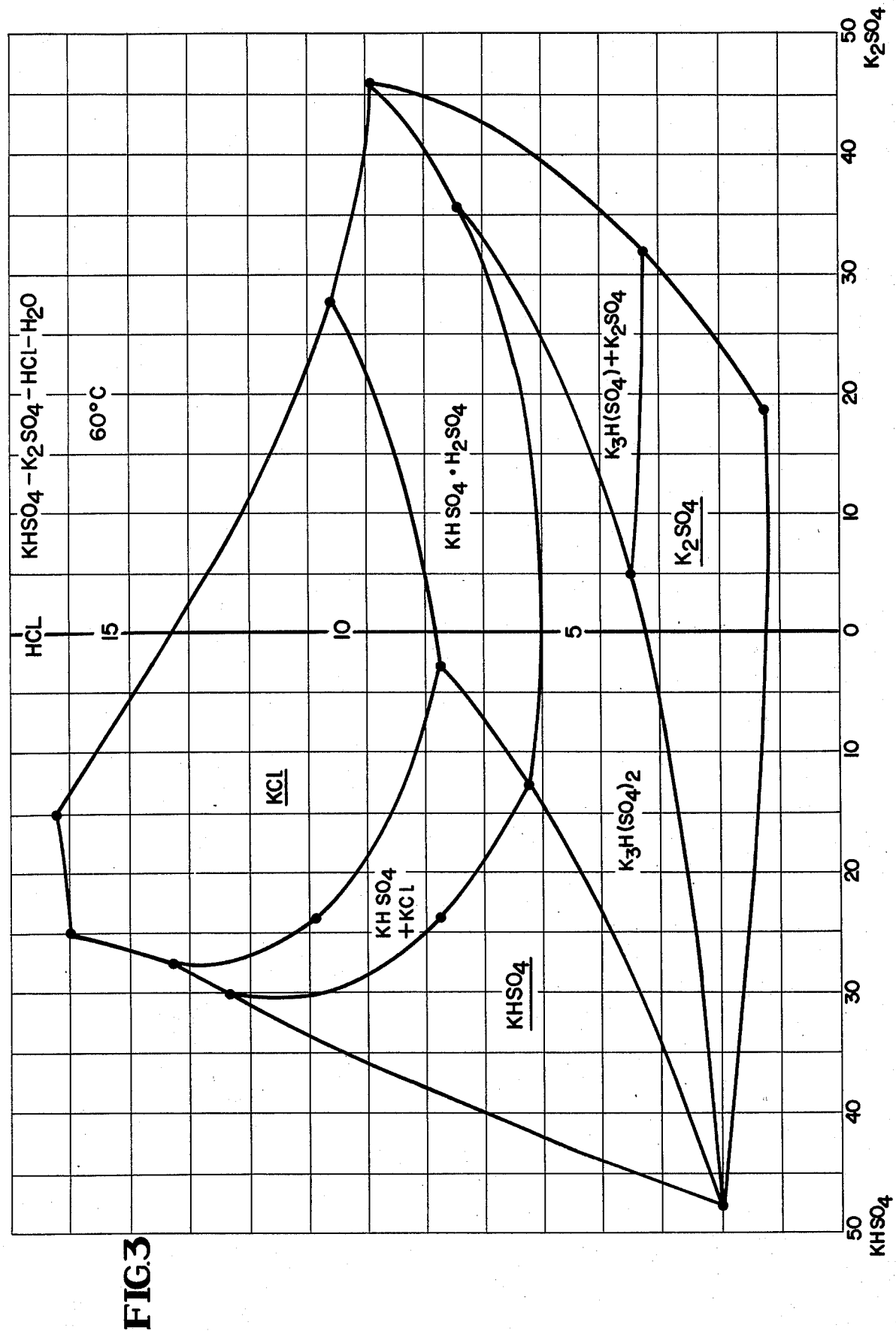

In FIGS. 2 and 3 there are provided phase diagrams which illustrate the theoretical amounts of potassium sulfate which may be obtained from this reaction when carried out at 40° C. (FIG. 2) and 60° C. (FIG. 3), and the various systems present therein. The phase diagrams of FIGS. 2 and 3 are two-dimensional phase diagrams and it will particularly be noted that a number of systems are present during the reaction including potassium sulfate, potassium bisulfate, various double salts of each potassium sulfate as well as potassium chloride and sulfuric acid. These phase diagrams indicate that the reaction should be operated under such conditions that the chloride content of the solution does not exceed about 10 weight percent for pure solutions and preferably is maintained below about 6–8% to prevent excessive crystallization of potassium chloride within the solution. The phase diagrams also provide explanations of why the basic reaction of this invention leads to the formation and precipitation of the potassium sulfate as the systems present, when maintained under the reaction conditions stated, permit the $K_2SO_4$ to precipitate within the system and thus upset the equilibrium sufficiently to cause formation of additional potassium sulfate. As will be noted, the temperature of reaction affects the amounts of the various compounds present in the system. However, $K_2SO_4$ in good yield is recovered at both temperatures.

As a result of the reaction of this invention there is provided a method for the production of potassium sulfate under very moderate reaction conditions and the formation of resultant reaction slurry containing the sulfate. In a continuous operation this provides a good recovery of high purity product.

The following examples are presented to illustrate the invention but it is not to be considered as limited thereto. In these examples and throughout the specification parts are by weight unless otherwise indicated.

EXAMPLES I, II and III

In these examples, continuous experiments were performed in which potassium bisulfate and potassium chloride were reacted in a three-stage continuous reactor system to produce potassium sulfate. The potassium bisulfate starting material was diluted with the indicated amount of water and fed into a mixing reactor using a metering pump. A screw feeder was used for the introduction of the solid potassium chloride.

The first vessel was the mixing reactor for the two feeds. The slurry was maintained at 80° C. and was rapidly stirred. All reactor vessles were under a slight vacuum to remove any hydrochloric acid produced and to prevent steam or hydrogen chloride from wetting the sides of the potassium chloride entry port. After initial mixing the slurry flowed by gravity into the second vessel which was the vessel for solubilization. In this vessel the temperature was maintained at 100° C. and the slurry was rapidly stirred. The average retention time was 1 hour. The liquid produced from the solubilization vessel was allowed to overflow into the third reactor which was a crystallizer maintained at a much lower indicated temperature to crystallize the potassium sulfate. After reaching steady state, liquid and crystallized product which were equal to the weights of the feeds, were removed every hour and filtered. The liquid was analyzed routinely and periodically, the unwashed cakes were dried at 110° C. and analyzed for $K_2O$, $SO_4$ hydrogen, chloride and by X-ray diffraction. In these runs the designation ratio of feed to water was 0.916 and the design mole ratio of potassium chloride to $KHSO_4$ was 1.11. Crystallization was carried out at 40° C. The unwashed solid product was shown to be about 85% $K_2SO_4$ and about 5% of a $K_2SO_4.KHSO_4$ salt with a chloride content of about 2%. When this solid was washed with saturated potassium sulfate the resulting solid contained 0.03% of chloride. In these runs the weight of unwashed dry solid per 100 parts of slurry was about 10. The amounts of reactants used and the results from these examples are set forth in the following Table I.

TABLE I

| Example Number | Actual Feed Grams/Hour | | | Ratio of Feed Grams | | | Grams Filt- Rate | Grams Product Cake |
|---|---|---|---|---|---|---|---|---|
| | KCl | $K_2O(1)$ | $SO_4^=$ | KCl | $KHSO_4$ | HOH | | |
| I | 229 | 140 | 268 | 60.3 | 100 | 175 | 1293 | 192 |
| II | 258 | 138 | 264 | 60.3 | 100 | 175 | 743 | 97 |
| III | 264 | 138 | 264 | 60.3 | 100 | 175 | 1275 | 134 |

| | Crystallization Temperature ° C | Filtrate Wt% | | | | Cake Wt% | | | | |
|---|---|---|---|---|---|---|---|---|---|---|
| | | $K_2O$ | $SO_4^=$ | Cl | Acid Ton | Product | | Cl$^-$ | Acid Ton | Wt% Slurry |
| | | | | | | $K_2O$ | $SO_4^=$ | | | |
| I | 40 | 18.0 | 15.3 | 9.75 | 0.22 | 45.6 | 53.7 | 2.75 | 0.31 | 12.3 |
| II | 40 | 19.3 | 16.1 | 9.31 | 0.23 | 46.1 | 56.1 | 2.09 | 0.32 | 11.3 |

TABLE I-continued

| III | 40 | 19.2 | 16.5 | 9.60 | 0.23 | 45.9 | 56.8 | 1.09 | 0.33 | 9.2 |

(1)$K_2O$ in the Potassium Bisulfate only.

EXAMPLE IV

In the following example, a complete three phase continuous experiment was carried out for the production of $K_2SO_4$. In the initial phase, $KHSO_4$ is prepared by the reaction of KCl and $H_2SO_4$; in the second phase $K_2SO_4$ is produced from KCl and 25% of the $KHSO_4$ produced from the initial phase; and in the third phase, the $KHSO_4$ is produced by mixing the filtrate recovered from the second phase with the recycle filtrate. Water was removed from the combined filtrates and the KCL and $H_2SO_4$ feed rates were reduced to compensate for the $K_2O$, Cl and $SO_4$ contents in the filtrate from the second phase.

In the initial phase, $KHSO_4$ was prepared by contacting $H_2SO_4$ at a feed rate of 3.5 g/min. and KCl at a feed rate of 2.6 g/min. in a series of two reactors. Reactor No. 1 was maintained at 80° C. and reactor No. 2 at 100° C. The contact time was 2 hours and the crystallizer for formation of the solid was maintained at a temperature of 45° C.

The products recovered from the reaction consisted of 4.8 g/min. of wet cake, 1.3 g/min. of HCl evolved and 7.9 g/min. of filtrate. The washed wet cake analyzed as 36.5% $K_2O$, 64.2% $SO_4$ and 0.10% Cl. The X-ray diffraction pattern of the cake indicated the presence of 90% of $KHSO_4$ and 10% $K_5H_3(SO_4)_4$. The filtrate analyzed as 5.0 wt. % $K_2O$, 19.0 wt. % $SO_4$, 14 wt. % Cl, 1.0 wt. % Na, 0.6 wt. % hydrogen ion and 61.2 wt. % water.

In the second step or phase, 25 weight percent of the $KHSO_4$ solid was contacted in a solubilizer at a rate of 6.7 g/min. with KCl at a rate of 4.2 g/min. and water at a rate of 11.7 g/min. The solubilizer was maintained at a temperature of 100° C. until complete solution was obtained. The solution was continuously removed to a crystallizer maintained at a temperature of 40° C. for product precipitation with recovery by filtration. The product dry cake (not washed) was recovered at a rate of 3.3 g/min. and product filtrate was recovered at a rate of 17.0 g/min. The recovered cake after washing with a saturated $K_2SO_4$ aqueous solution, analyzed as 51.7% $K_2O$, 46.9% $SO_4$ and 0.03% Cl. X-ray diffraction indicated the cake product contained 96% $K_2SO_4$ and 4% of the double salt $K_2SO_4.KHSO_4$. The recovered filtrate analyzed as 19.0% $K_2O$, 16.0% $SO_4$, 9.6% Cl, 58.3% $H_2O$ and 0.23% hydrogen ion.

In the third phase, the filtrate from the $K_2SO_4$ plant is recycled to the $KHSO_4$ plant by initially mixing the filtrate from the $KHSO_4$ plant with the filtrate from the $K_2SO_4$ plant and removing an equivalent amount of water from the resulting mixed stream. The resulting combined concentrate was analyzed and found to contain 19.6% $K_2O$, 28.8% $SO_4$, 10.5% Cl, 0.43% hydrogen ion, 1.0% Na and 42.9% $H_2O$. In order to reduce the equivalent amount of KCl and $H_2SO_4$ from the feed to the $KHSO_4$ plant requirements, the feed rates were as follows:

| | |
|---|---|
| KCl | 1.6 g/min. |
| $H_2SO_4$ (97%) | 2.9 g/min. |
| Filtrate from $K_2SO_4$ plant | 8.3 g/min. |
| Recycle filtrate | 8.3 g/min. |
| Water removed | 4.2 g/min. |

In this reaction, reactor No. 1 was maintained at 80° C. reactor No. 2 at 106° C. and the crystallizer at 45° C.

The reaction was carried out as described for step 1 to provide product at the rate of filtrate 7.4 g/min. wet cake, 6.3 g/min. and dry cake 6.1 g/min. The product cake was washed with a saturated $K_2SO_4$ aqueous solution. The products analyzed as follows:

| Component | Filtrate | Washed Cake |
|---|---|---|
| $K_2O$ | 8.3 | 37.5 |
| $SO_4$ | 19.7 | 61.2 |
| Cl | 11.9 | 0.12 |
| $H^+$ | 0.6 | & — |
| Na | 1.4 | — |
| HOH | 59.4 | — |

The invention has been described herein with reference to certain preferred embodiments. However, as obvious variations thereon will appear to those skilled in the art the invention is not to be considered as limited thereto.

What is claimed is:

1. A method for the production of potassium sulfate substantially free from double salts thereof which comprises:
   1. forming an aqueous solution containing potassium bisulfate;
   2. heating said aqueous solution to a temperature of about 65°–110° C.;
   3. adding potassium chloride to said aqueous solution to react with said potassium bisulfate, the amount of potassium chloride being added ranging from a substantially molar equivalent amount up to about a 15% molar excess, but wherein the maximum chloride content of the resulting solution is maintained below about 6–8 wt. %;
   4. continuing the reaction at a temperature of about 65°–110° C. until complete solution is achieved;
   5. cooling the resulting solution to a temperature of about 40°–60° C.;
   6. permitting the resulting said potassium sulfate to crystallize from solution; and
   7. recovering the solid potassium sulfate,
   wherein crystallization and initial precipitation of the potassium sulfate on cooling upsets the equilibrium of the system sufficiently to cause formation and precipitation of additional potassium sulfate product.

2. A method according to claim 1 wherein about one mole of potassium chloride is added to an aqueous solution containing about one mole of potassium bisulfate.

3. A method according to claim 1 wherein a molar excess of up to about 15% of potassium chloride is added to an aqueous solution containing about one mole of potassium bisulfate.

4. A method according to claim 1 wherein the chloride content of the solution in step (3) is maintained in the range of about 1 to about 4 wt. %.

5. A method according to claim 1 wherein reaction of the solution of potassium chloride and potassium bisulfate is carried out at a temperature of about 100° C. and the resulting solution is cooled to a temperature of about 40° C. to crystallize the potassium sulfate.

6. A continuous method for the formation of potassium sulfate substantially free from double salts thereof, which comprises:
 1. reacting potassium chloride and sulfuric acid with evolution of hydrogen chloride to produce a slurry of potassium bisulfate;
 2. recovering the solid potassium bisulfate;
 3. dissolving at least a portion of the potassium bisulfate in an excess of water to form an aqueous solution containing potassium bisulfate;
 4. heating said aqueous solution to a temperature of about 65°–110° C.;
 5. adding potassium chloride to said aqueous solution to react with said potassium bisulfate, the amount of potassium chloride being added ranging from a substantially molar equivalent amount up to about 15% molar excess, but wherein the maximum chloride content of the resulting solution is maintained below about 6–8 wt. %;
 6. continuing the reaction at a temperature of about 65°–110° C. until complete solution is achieved;
 7. cooling the resulting solution to a temperature of about 40°–60° C.;
 8. permitting the resulting said potassium sulfate to crystallize from solution;
 9. recovering the solid potassium sulfate from the solution;
 10. evaporating excess water from the solution to provide a mother liquor concentrate; and
 11. recycling the mother liquor concentrate to step (1) as reaction medium for potassium bisulfate formation;
 wherein crystallization and initial precipitation of the potassium sulfate on cooling upsets the equilibrium of the system sufficiently to cause formation and precipitation of additional potassium sulfate product.

7. A method according to claim 6 wherein the potassium bisulfate formation reaction is carried out at a temperature of about 80°–120° C.

8. A method according to claim 7 wherein the potassium chloride and sulfuric acid are mixed in substantially equimolar amounts.

9. A method according to claim 8 wherein the hydrogen chloride evolved from the potassium bisulfate reaction is recovered by water scrubbing or as anhydrous HCl.

10. A method according to claim 6 wherein solid potassium chloride is added to the potassium bisulfate solution.

11. A method according to claim 6 wherein about 50–70 weight percent of the potassium bisulfate recovered from step (2) is dissolved in an excess of water, heated to a temperature of 65°–110° C., and about one molar equivalent of solid potassium chloride added thereto.

12. A method according to claim 11 wherein solid potassium chloride is added to the aqueous solution of potassium bisulfate at a temperature of about 100° C.

* * * * *

Disclaimer 3,998,935.—*Ben E. Adams,* Hanford, Calif.; *John B. Sardisco,* Shreveport, La.; and *Erhart K. Drechsel,* Houston, Tex. MANUFACTURE OF POTASSIUM SULFATE. Patent dated Dec. 21, 1976. Disclaimer filed Nov. 24, 1982, by the assignee, *Pennzoil Co.*

Hereby enters this disclaimer to claims 1, 2, 3, 4, 5 and 6 of said patent.
*[Official Gazette January 11, 1983.]*